United States Patent [19]
Yasuda

[11] Patent Number: 6,081,347
[45] Date of Patent: *Jun. 27, 2000

[54] IMAGE DATA TRANSFER METHOD AND IMAGE TRANSFER SYSTEM THEREFOR

[75] Inventor: Masataka Yasuda, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/846,178

[22] Filed: Apr. 28, 1997

[30] Foreign Application Priority Data

Apr. 26, 1996 [JP] Japan ................................ 8-108221

[51] Int. Cl.⁷ .................................................. H04N 1/00
[52] U.S. Cl. .......................................... 358/400; 358/1.15
[58] Field of Search ..................... 358/468, 442, 358/400, 1.13, 1.14, 1.15, 1.16, 1.17, 1.18, 401; 395/112, 113, 114, 115, 116; 709/233, 234, 232, 231, 235

[56] References Cited

U.S. PATENT DOCUMENTS

5,341,221 8/1994 Mikada ................................ 358/400
5,625,757 4/1997 Kageyama et al. ..................... 395/113
5,630,062 5/1997 Okutsu ................................... 395/114

*Primary Examiner*—Amelia Au
*Assistant Examiner*—Vikkram Bali
*Attorney, Agent, or Firm*—Fitzpatrick, Cella, Harper & Scinto

[57] ABSTRACT

An image transfer method and an image transfer system use a system having a personal computer (PC) and a facsimile apparatus and another system having another facsimile apparatus and a plurality of photocopiers which are connected by a local area network (LAN). Both systems are connected to a public circuit. The two facsimile apparatuses are connected by the public circuit. One photocopier to which image data generated by the PC is outputted is designated. The page-description language capable of being processed by the designated photocopier is automatically selected, and the image data is generated based on the selected page-description language, and is transferred to the designated photocopier. In addition, in accordance with a communication load of the LAN, connection to the public circuit is broken or restored. The optimum page-description language selected based on the function of each photocopier is transferred to the photocopier capable of processing the selected optimum page-description language, and subsequently, the connection to the public circuit is broken.

20 Claims, 8 Drawing Sheets

IMAGE DATA TRANSFER METHOD AND IMAGE TRANSFER SYSTEM THEREFOR

BACKGROUND OF THE INVENTION

1. Field of the Invention

The present invention relates to image data transfer methods and image transfer systems, and in particular to an image data transfer method and an image transfer system which are used to transfer image data between different systems.

2. Description of the Related Art

There is a conventional information processing system in which a plurality of local area networks (LANS) are mutually connected via a network by using communication means such as facsimile apparatuses and so forth. According to the system, image data generated by a computer operating in environments of a certain LAN can be transferred through a facsimile apparatus to an image processing apparatus operating in environments of another LAN in order to output an image.

However, the above conventional example has the following problems:

(1) For example, when image data as a page-description language code (PDL) generated by a computer operating in environments of a certain LAN is transferred by using the digital communication function of a digital facsimile apparatus to a plurality of image formation apparatuses operating in environments of other LANs so that the PDL code is bit-mapped to output an image, if the PDL functions and the PDL code systems supported by the respective image formation apparatuses are different, the computer, which originally transfers the image data, needs to activate the driver software adapted for each image formation apparatus to which the image data is transferred and to repeat the same transfer process with respect to the respective image formation apparatuses.

This is said to be complicated work for an user.

(2) Switching types of driver software for the computer which has originally transferred the image data, and re-activating the switched software in order to transfer the image data not only lengthens the total transfer time but also increases a communication cost if a public circuit is used.

SUMMARY OF THE INVENTION

Accordingly, it is an object of the present invention to provide an image data transfer method and an image transfer system in which operability for an user can be enhanced, and the transfer time of image data can be shortened to reduce an operation cost of the method and system.

According to the present invention, the foregoing object has been achieved through provision of a method for transferring image data between a first system having an image data generating apparatus and a second system having a plurality of image formation apparatuses connected to the first system by a public circuit, the plurality of image formation apparatuses being capable of processing image data described in different page-description languages, the method comprising: the connection step of connecting the first system and the second system by using the public circuit; the designation step of designating one image formation apparatus to which the image data generated by the image data generating apparatus is outputted, from the plurality of image formation apparatuses; the generating step of automatically selecting the page-description language capable of being processed by the designated image formation apparatus in accordance with the designation by the designation means, and generating the image data based on the selected page-description language; and the transfer step of transferring the image data generated by the generating means to the designated image formation apparatus designated by the designation means.

According to another aspect of the present invention, the foregoing object has been achieved through the provision of an image transfer system formed by mutually connecting via a public circuit a first system having an image data generating apparatus and a second system having a plurality of image formation apparatuses capable of processing image data described in different page-description languages, the image transfer system further having: designation means for designating from the plurality of image formation apparatuses one image formation apparatus to which the image data generated by the image data generating apparatus is outputted; generating means for automatically selecting the page-description language capable of being processed by the designated image formation apparatus in accordance with the designation by the designation means, and generating the image data based on the selected page-description language; and transfer means for transferring the image data generated by the generating means to the designated image formation apparatus designated by the designation means.

In respect of the transfer of the image data from the image data generating apparatus to the plurality of image formation apparatuses, either a first mode for transferring the image data at a low speed or a second mode for transferring the image data at a high speed is designated.

The image transfer method and the image transfer system are controlled so that, when the functions of the plurality of image formation apparatuses are analyzed, and the analyzed result is informed to the image data generating apparatus, with the transfer performed in the second mode, the optimum page-description language is selected in accordance with the information so that the image data is generated, the image data is transferred to the image formation apparatus capable of processing the selected optimum page-description language, and connection to the public circuit is broken after termination of the transfer of the image data described in the selected optimum page-description language.

In addition, by establishing mutual connection among the plurality of image formation apparatuses via the LAN, the image formation apparatus capable of processing the selected optimum page-description language may expand the transferred image data to bit-map data to transfer the bit-map data to another image formation apparatus designated via the LAN. The bit-map data may be stored in the storage means. The image formation apparatus designated by the designation means, which is incapable of processing the selected optimum page-description language, may demand data-transfer from the image formation apparatus capable of processing the selected optimum page-description language.

The second system may restore connection to the first system by monitoring the second system a communication load of the LAN, inquiring the telephone number in accordance with the monitored communication load, breaking connection to the first system after the inquiry, and using the obtained telephone number after the break. After the restoration of the connection, the second system may be controlled to transfer the image data.

According to the above-described present invention, in respect of transfer of image transfer between a first system having an image data generating apparatus and a second system, connected to the first system by a public circuit, having a plurality of image formation apparatuses capable of processing the image data described in different page-description languages, the first system and the second system are connected by the public circuit, one image formation apparatus to which the image data generated by the image generating apparatus is outputted is designated from the plurality of image formation apparatuses, the page-description language capable of being processed by the designated image formation apparatus is automatically selected, and the image data is generated based on the selected page-description language and is transferred to the designated image formation apparatus. Thus, this manner eliminates the operation of an user to transfer the image data to the desired image formation apparatus, and advantageously enhances the user's operability.

In addition, connection to the public circuit is broken or restored in accordance with the operating condition of the system, and the connection is broken after the image data has been transferred to only the image formation apparatus capable of processing the optimum page-description language selected based on the function of each image formation apparatus. Thus, this increases an efficiency of the use of the public circuit and shortens time in which the public circuit is used, which can advantageously reduces a cost for using the public circuit.

DESCRIPTION OF THE PREFERRED EMBODIMENTS

[First Embodiment]

Figure 1:
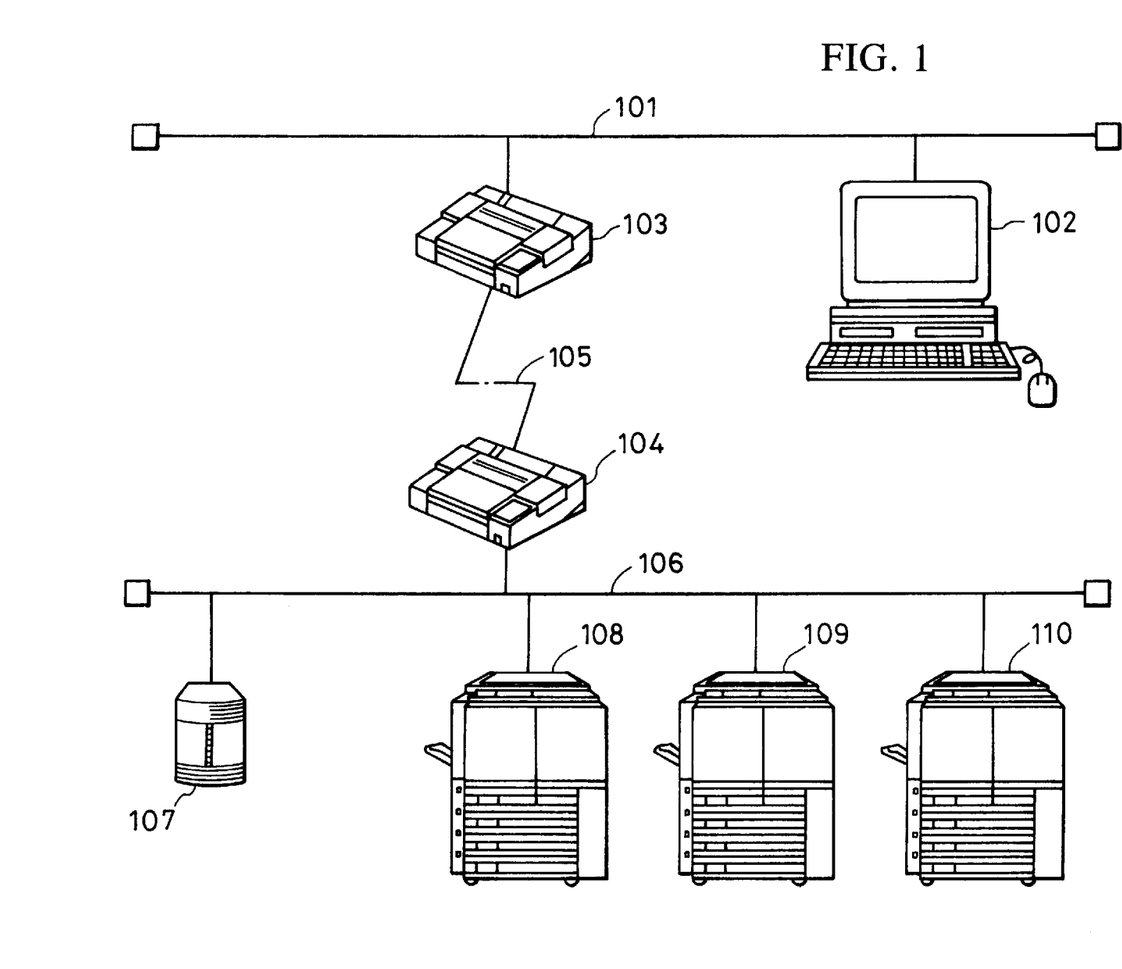
FIG. 1 is a block diagram showing an image transfer system according to a typical embodiment of the present invention.

FIG. 1 shows a block diagram of an image transfer system according to a typical embodiment of the present invention. The image transfer system is also used in common in second and third embodiments described below.

The image transfer system includes LANs 101 and 106, a general purpose personal computer (hereinafter referred to as a "PC") 102 connected to the LAN 101, which can communicate with an external unit via the LAN 101, facsimile apparatuses 103 and 104 connected respectively to the LANs 101 and 106, and a public circuit 105.

The PC 102 has several types of printer drivers therein, and can automatically switch the printer drivers depending on the function of a printer to be used. The PC 102 is provided with a CPU, a memory and a display like a liquid crystal display (LCD) or cathode-ray tube (CRT). The memory contains plural types of programs to be executed by the CPU. The PC 102 is also provided with a unit for showing instructions for input with a keyboard and a mouse. The facsimile apparatuses 103 and 104 each have a large-sized liquid crystal touch panel, and can transfer image data by using the public circuit 105. In accordance with a predetermined protocol, the facsimile apparatuses 103 and 104 can communicate with PCs and image formation apparatuses like photocopiers which are connected to the LANs to which the facsimile apparatuses are connected. Thus, the facsimile apparatus 103 and 104 can transfer image data transferred via the public circuit 105, to the PCs and the image formation apparatuses such as photocopiers.

A job server 107 connected to the LAN 106 controls the operations of units such as printers and the PCs connected to the LAN 106. The job server 107 obtains functional information on units which have previously been registered therein. The job server 107 informs the properties of image data to be transferred, to a PC which has demanded printing, based on the obtained functional information.

Photocopiers (image formation apparatuses) 108 to 110 connected to the LAN 106 each have a large-sized liquid crystal touch panel, the function of scanning and the function of printing. Accordingly, the photocopiers 108 to 110 function as simple photocopiers when are independent from the LAN 106 and the job server 107, and also function as printers which receive command data described in a page-description language sent from a PC, and internally expand the received command data to print the output. Page-description languages which can be processed by the photocopiers 108 to 110 differ. In this embodiment, the page-description language which can be processed by the photocopier 108 is Laser-beam-printer Image Processing System (LIPS), the page-description language which can be processed by the photocopier 109 is Post Script (PS), and the page-description language which can be processed by the photocopier 110 is Printer Control Language (PCL).

Figure 2:
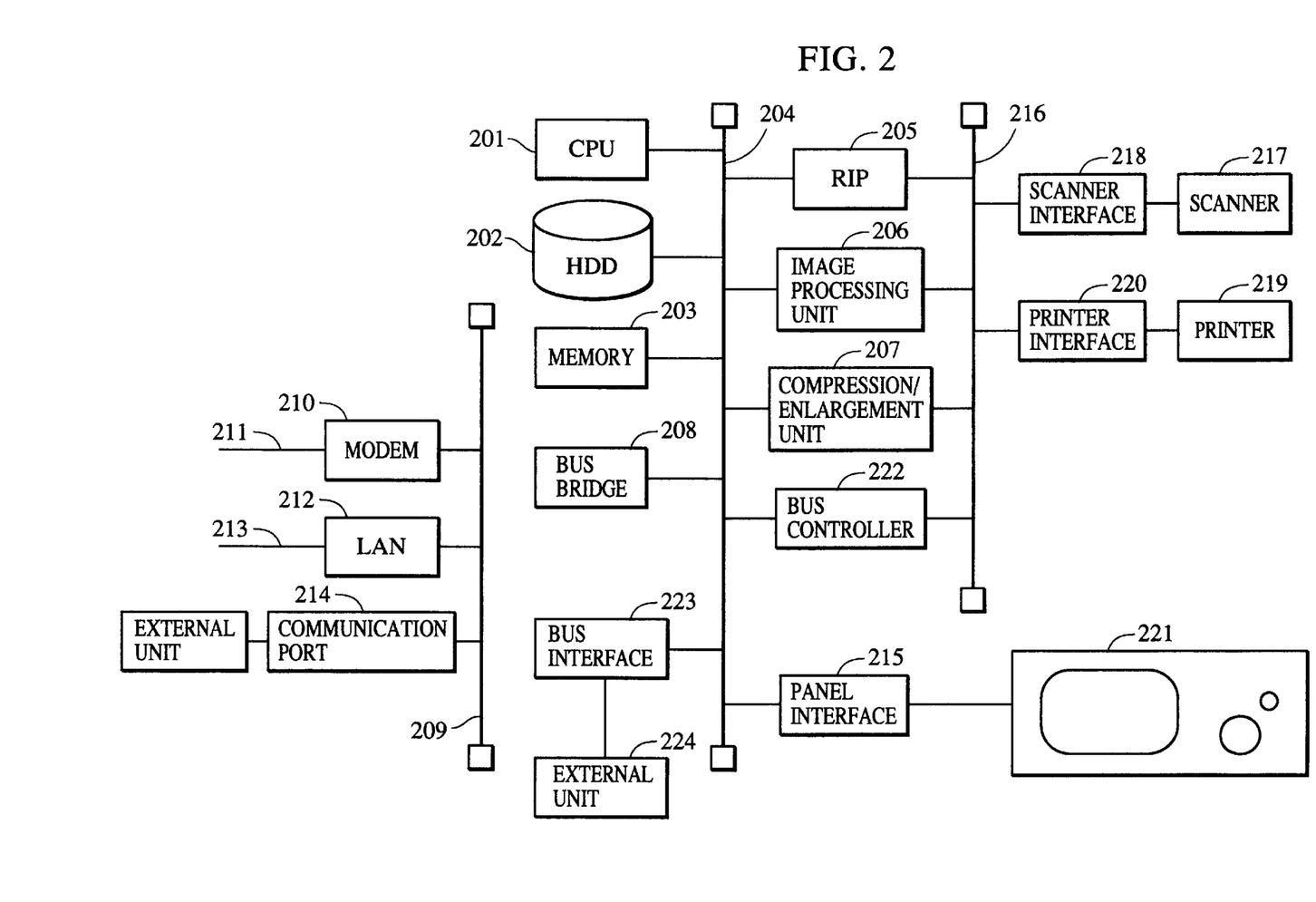
FIG. 2 is a block diagram showing each structure of photocopiers 108 to 110.

FIG. 2 shows a block diagram of the photocopiers 108. The photocopiers 108 to 110 process different page-description languages, but they are identical in function. Thus, the block diagram also shows the structure of the other photocopiers 109 and 110.

The structure includes a microprocessor (CPU) 201 which is operated by a real-time operating system (OS) to perform the whole control, a large capacity hard disc drive (HDD) 202 which is controlled by the CPU 201 to contain a plurality of applications to be executed by the CPU 201, a memory 203 which is used as a work area to execute applications and can be accessed at a high speed by the CPU 201, and a high speed CPU bus 204 for transferring data at a high speed among the CPU 201, the HDD 202, the memory 203, and functional units mentioned below (DMA transfer). The HDD 202 is also used to temporarily store image data on demand and to store information concerning an image output demand informed from an external unit like an image input unit mentioned below.

A raster image processor (RIP) 205 receives, via the high-speed CPU bus 204, an image formation command which is inputted from an external interface connected to a computer mentioned below, and generates a bit-map image in accordance with contents of the command in order to output the image to a high-speed image bus. The RIP 205 can process page-description languages such as PS, PCL, LIPS, and Canon Printing System Language (CaPSL).

In accordance with process commands from the CPU 201, an image processing unit 206 performs a filtering process such as smoothing and edging to an image inputted from the high-speed image bus and performs a character recognition process and an image separation process for separating character part and image part.

A compression/enlargement unit 207 compresses the image inputted from the high-speed image bus using image compression methods such as MH (modified Huffman) coding, MR (modified READ) coding, MMR (modified modified READ) coding, and JPEG, and sends the compressed data to the high-speed CPU bus 204 or back to the high-speed image bus, or the compression/enlargement unit 207 reversely enlarges compressed data inputted from the two buses in accordance with the method used for compression, and sends the enlarged data to the high-speed image bus.

A bus bridge controller 208 connects the high-speed CPU bus 204 and a low-speed CPU bus mentioned below in order to absorb the difference between the processing speeds of the buses. The CPU 201 operating at a high speed uses the bus bridge controller 208 to access a unit, connected to the low-speed CPU bus, which transfers data at a low speed.

The low-speed CPU bus 209 is formed so that its data transfer speed is lower than that of the high-speed CPU bus 204. Units of relatively low processing speed are connected to the low-speed CPU bus 209. A modem 210 between a public circuit 211 and the low-speed CPU bus 209 modulates digital data sent from the low-speed CPU bus 209 so as to be outputted to the public circuit 211, or demodulates modulated data sent from the public circuit 211 to digital data which can be processed in the photocopier. A LAN board 212 is used to establish connection to the LAN and to transmit or receive data via the LAN.

A communication port 214 is provided with, for example, a computer interface, such as RS-232C (for serial communication) or Centronics interface (for parallel communication), which is used for establishing connection to a computer, for receiving control commands from the computer, and for sending the status back to the computer.

A panel interface 215 which transmits/receives various control signals to/from an operation panel mentioned below conveys, to the CPU 201, input signals from keys arranged on the operation part of the panel, or converts the resolution of image data generated by the compression/enlargement unit 207 so that the image data can be displayed on an LCD mounted on the operation part.

The high-speed image bus 216 inputs or output image data by establishing mutual connection among the RIP 205, the image processing unit 206, the compression/enlargement unit 207, a scanner interface and a printer interface mentioned below. The high-speed image bus 216 is not controlled by the CPU 201 but is controlled by a bus controller 222 to transfer data.

A scanner (image input unit) 217 provided with an autofeeder for sheets of paper includes CCD color sensors for red, green and blue. Image data scanned by the scanner 217 is transferred to the high-speed image bus by a scanner interface. The scanner interface 218 performs the optimum gradation conversion of the image data inputted by the scanner 217 in accordance with the subsequent process so that the three primary color data (red, green and blue) of the inputted image data are converted to data of cyan, magenta, yellow and black.

A printer 219 prints an image data received from a printer interface mentioned below, as a visible image on recording paper. The printer 219 is, for example, an ink-jet printer which uses drops of ink by an ink-jet method to print an image on recording paper, or a laser-beam printer which uses a laser beam by an electrophotographic technique to form an image on a photosensitive drum so that the image is printed on recording paper. When transferring image data transferred from the high-speed image bus 216 having a predetermined bus width to the printer 219, the printer interface 220 performs bus width conversion for converting the bus width to a bus width in accordance with gradation by the printer 219, and the printer interface 220 is used for absorbing the difference between the print speed of the printer 219 and the image-data transfer speed by the high-speed image bus 216.

The operation panel 221 includes the LCD, the touch panel attached on the LCD, and a plurality of input keys. A signal inputted from the touch panel or the key is sent to the CPU 201 via the panel interface 215. The LCD displays the image data sent from the panel interface 215, or a menu and icons for operation.

An external unit 224 can perform data communication via a bus interface 223.

Figure 3:
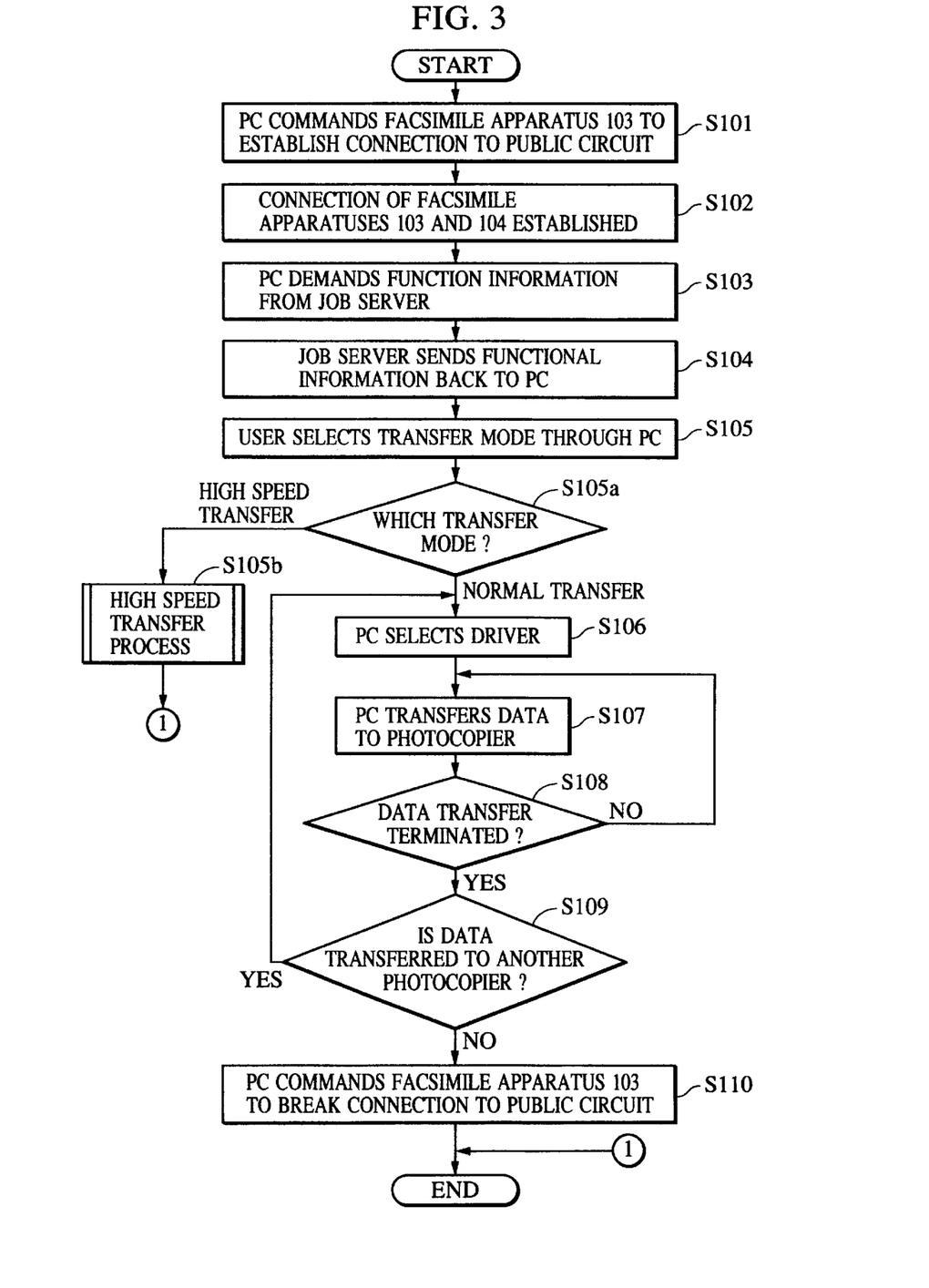
FIG. 3 is a flowchart showing an image transfer process according to a first embodiment of the present invention.

An image transfer process executed by the above-structured system will be described below by referring to FIG. 3, the flowchart of FIG. 5, and a display screen on the operation panel 221 shown in FIG. 4. This embodiment describes an image data process performed when a document produced by the PC 102 is outputted from the photocopiers 108 to 110 connected to another network (LAN 106).

In step S101, the PC 102 connected to the LAN 101 commands the facsimile apparatus 104 to establish connection using the public circuit 105 in order to output image data from the photocopiers 108 to 110 by communicating with the facsimile apparatus 103 with a predetermined protocol. In step S102, the facsimile apparatus 103 establishes communication with the facsimile apparatus 104, using the public circuit 105 based on the telephone number of the facsimile 104, informed by the PC 102. In step S103, the PC 102, which has been informed of the established communication with the facsimile apparatus 104 from the facsimile apparatus 103, inquires of the job server 107 connected to the LAN 106 about functional information on the photocopiers, printers, and so forth, which are connected to the LAN 106.

At this time, the facsimile apparatuses 103 and 104 operate as gateways to connect the LANs 101 and 106, thus, the PC 102 can communicate with the job server 107 in accordance with the predetermined protocol. In other words, while the PC 102 and the job server 107 are communicating with each other in accordance with the protocol, the properties of the protocol and contents of the communication data, as ordinary communication data, are exchanged between the facsimile apparatuses 103 and 104. Accordingly, when data is sent to the LAN from the facsimile apparatus, the data format is converted in accordance with the properties of the protocol.

In step S104, the job server 107, which has been inquired about the functional information on the photocopiers and the printers, inquires of the photocopiers 108 to 110 in accordance with the predetermined protocol about the function of printing, and obtains information on what types of page-description languages can be processed.

In the photocopiers 108 to 110, each CPU 201 has obtained, from the RIP 205, information on what types of page-description languages can be processed, and the contents of the information are stored in the HDD 202. Consequently, the photocopiers 108 to 110 transmit the information stored in the HDD 202 when they are inquired by the external unit like the job server 107 about functional information. The photocopiers 108 to 110 have information on basic functions, such as information on the resolution by the scanner 217 and the storage capacity of the HDD 202. Thus, when the external unit inquires of the photocopiers 108 to 110, they can inform the external unit of the information on basic functions. The job server 107, which has obtained the functional information on the photocopiers 108 to 110, transmits to the LAN 106 the functional information on the photocopiers 108 to 110.

Figure 4:
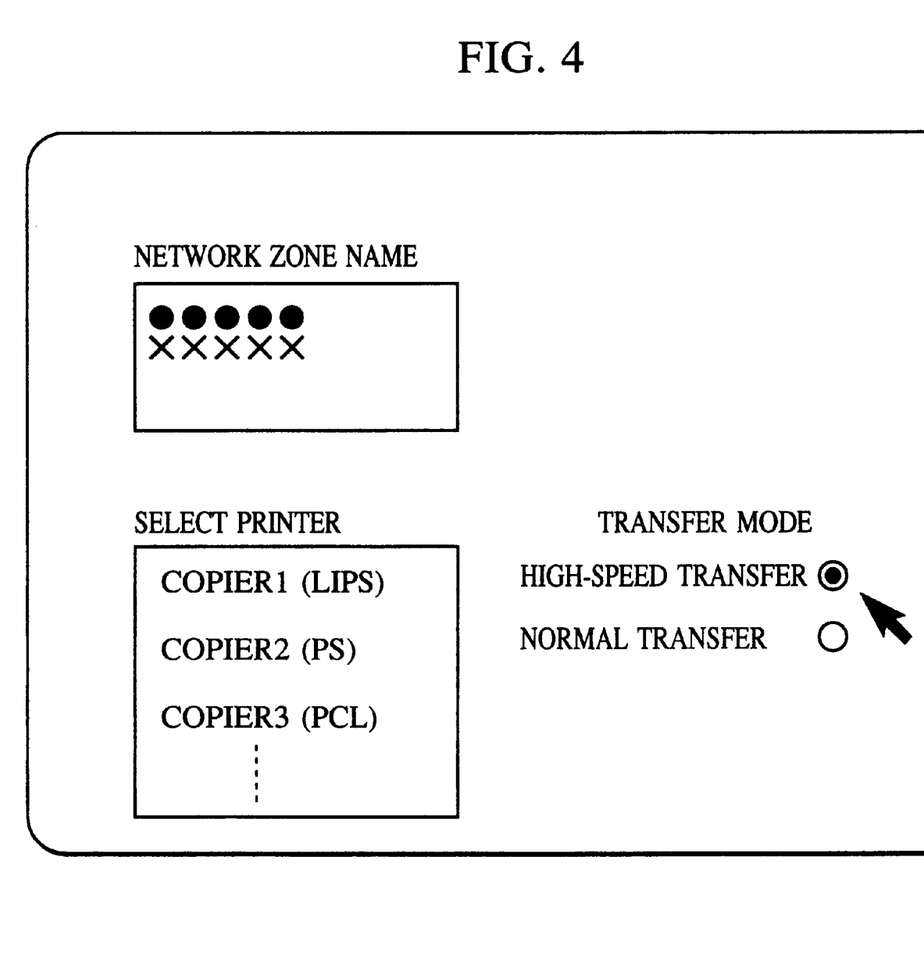
FIG. 4 is a chart showing a display on an operation panel 221.
Figure 5:
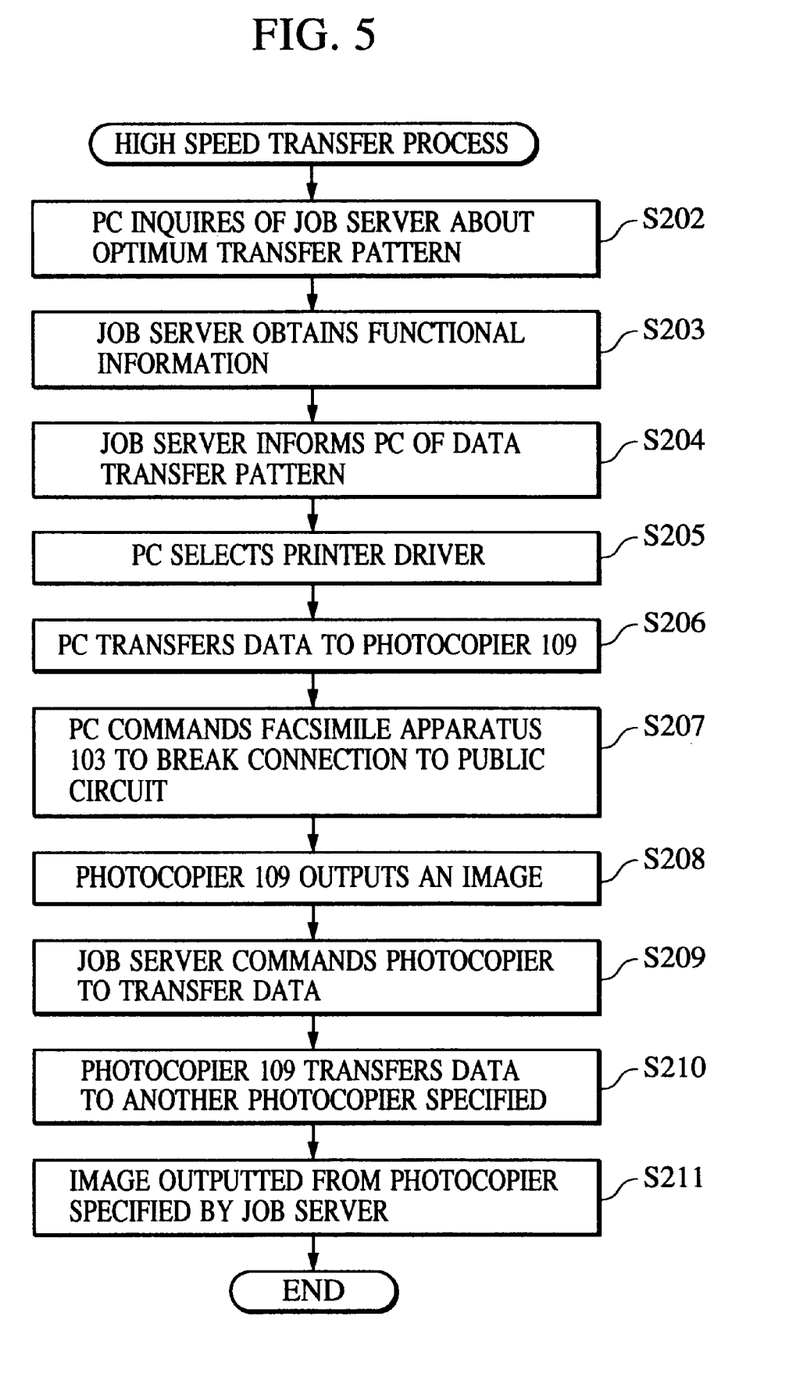
FIG. 5 is a flowchart showing a high-speed transfer process according to the first embodiment of the present invention.

In step S105, the PC 102, which has received the functional information on the photocopiers 108 to 110 from the job server 107, projects a selection display (printer selection display) (as shown in FIG. 4) on the CRT or LCD mounted to the PC 102 in order to demand selection by the user. The user selects one photocopier for output from the selection display.

FIG. 4 shows the selection display by which the user selects one photocopier from the photocopiers 108 to 110 connected to the LAN 106. On the selection display shown in FIG. 4, "COPIER 1 (LIPS)" means the photocopier 108 capable of processing LIPS, "COPIER 2 (PS)" means the photocopier 109 capable of processing PS, and "COPIER 3 (PCL)" means the photocopier 110 capable of processing PCL. The transfer mode of image data, either "HIGH-SPEED TRANSFER" or "NORMAL TRANSFER" on the selection display, can also be selected. In step S105, the transfer mode of image data is selected.

In step S105a, the process confirms whether the transfer mode is the high-speed transfer or the normal transfer. If the process has determined that the transfer mode is the normal transfer, the process proceeds to step S106. If it has determined that the transfer mode is the high-speed transfer, the process proceeds to S105b to execute a high-speed transfer process. And then, the process proceeds to step S110. The high-speed transfer process will be described below by referring to a flowchart shown in FIG. 5.

In steps S106 to S109, the PC 102 successively transfers image data to the photocopiers 108 to 110.

In step S106, when the PC 102 transfers the image data to the photocopier 108, the PC 102 selects one printer driver based on the functional information on the photocopier 108 previously transferred from the job server 107. In the successive step S107, the PC 102 converts the image data to be transferred, to a LIPS code, and transfers the converted image data to the photocopier 108. In step S108, the PC 102 monitors termination of the transfer, and if it has determined that the transfer is incomplete, the process returns to step S107. If it has determined that the transfer is complete, the process proceeds to step S109. In step S109, the PC 102 confirms whether or not the image data transfer to all the photocopiers (the photocopiers 108 to 110 in this embodiment) is complete. If it has confirmed that the image data transfer is incomplete, the process returns to step S106. If it has confirmed that the image data transfer is complete, the process proceeds to step S110.

In the foregoing steps S106 to S109, automatically, the PC 102 selectively activates the printer driver for the LIPS code when transferring the image data to the photocopier 108. The PC 102 selectively activates the printer driver for the PS when transferring the image data to the photocopier 109. And, the PC 102 selectively activates the printer driver for the PCL when transferring the image data to the photocopier 110.

The photocopier 108, which has received the LIPS code, transfers the LIPS code to the RIP 205, in which the transferred code is bit-mapped. Successively, the photocopier 108 transfers the bit-map data to the printer 220 via the printer interface 220 to output an image formed on a recording medium like recording paper. Subsequently, when a PS code is sent from the PC 102, the photocopier 109 receives the PS code to form an image, and when a PCL code is sent from the PC 102, the photocopier 110 receives the PCL code to form an image in order to output a printed image, similar to the photocopiers 108 and 109.

When the image data is completely outputted to the photocopiers 108 to 110 as described above, the process proceeds to step S110, where the PC 102 commands the facsimile apparatus 103 to break connection to the public circuit 105 connected to the facsimile apparatus 104, and the process terminates.

By referring to the flowchart of FIG. 5, the high-speed transfer process executed when the high-speed transfer mode has been selected for the transfer mode will be described below.

In step S202, the PC 102 inquires of the job server 107 about the optimum data transfer pattern. In response to this inquiry, in step S203, the job server 107 obtains functional information on the photocopiers connected to the LAN 106. In step S204, based on the obtained information, the job server 107 commands the PC 102 to transfer image data so that the traffic of the public circuit 105 between the facsimile apparatuses 103 and 104 is least.

For example, when, based on the functional information, the job server 107 has determined that the image which has been once bit-mapped from the PS code received by the RIP 205 of the photocopier 108 can be transferred to the other photocopiers via the LAN board by using the pre-installed printer driver, the job server 107 commands the PC 102 to transmit the PS code to the photocopier 109. The above-described control eliminates the need of transferring the LIPS code or PCL code via the public circuit 105, which causes the least traffic of the public circuit 105.

The following processing steps assume the above embodiment in order to describe the present invention more definitely.

In step S205, the PC 102 automatically selects and activates the printer driver for PS when being informed by the job server 107. In step S206, the PC 102 transfers the PS code to the photocopier 109. In step S207, when the transfer of the PS code to the photocopier 109 is complete, the PC 102 commands the facsimile apparatus 103 to break connection to the public circuit 105 connected to the facsimile apparatus 104, and terminates its print process.

In step S208, the photocopier 109, which has received the PS code from the PC 102, bit-maps the image based on the received PS code, and forms an image in the printer 219, from which the printed image is outputted. When the photocopier 109 receives commands from the job server 107 in step S209, the photocopier 109 transmits to the photocopiers 108 and 110 the image data bit-mapped from the PS code. At this time, the photocopier 109 informs the photocopiers 108 and 110, in advance, of the resolution of the image data bit-mapped from the PS data to be transmitted by the photocopier 109. At the same time, the photocopiers 108 and 110 convert the resolution of the image data transmitted from the photocopier 109 in each image processing unit 206. Subsequently, in step S211, formed images are outputted from the photocopiers 108 and 110.

According to the above-described embodiment, in accordance with the performance and transfer mode of the photocopier to which the image data is transferred, the PC which has originally transferred image data, selects the optimum printer driver, and controls it to transfer the image data to only one photocopier. The selected photocopier, which receives the image data from the PC, distributes the image data to other photocopiers. This manner causes the least traffic of the public circuit, and shortens duration in which the public circuit is used, which thus can reduce a cost for using the public circuit. In addition, this manner eliminates the need of switching the printer drivers to meet each photocopier, which thus can improve operability for the user.

[Second Embodiment]

Figure 6:
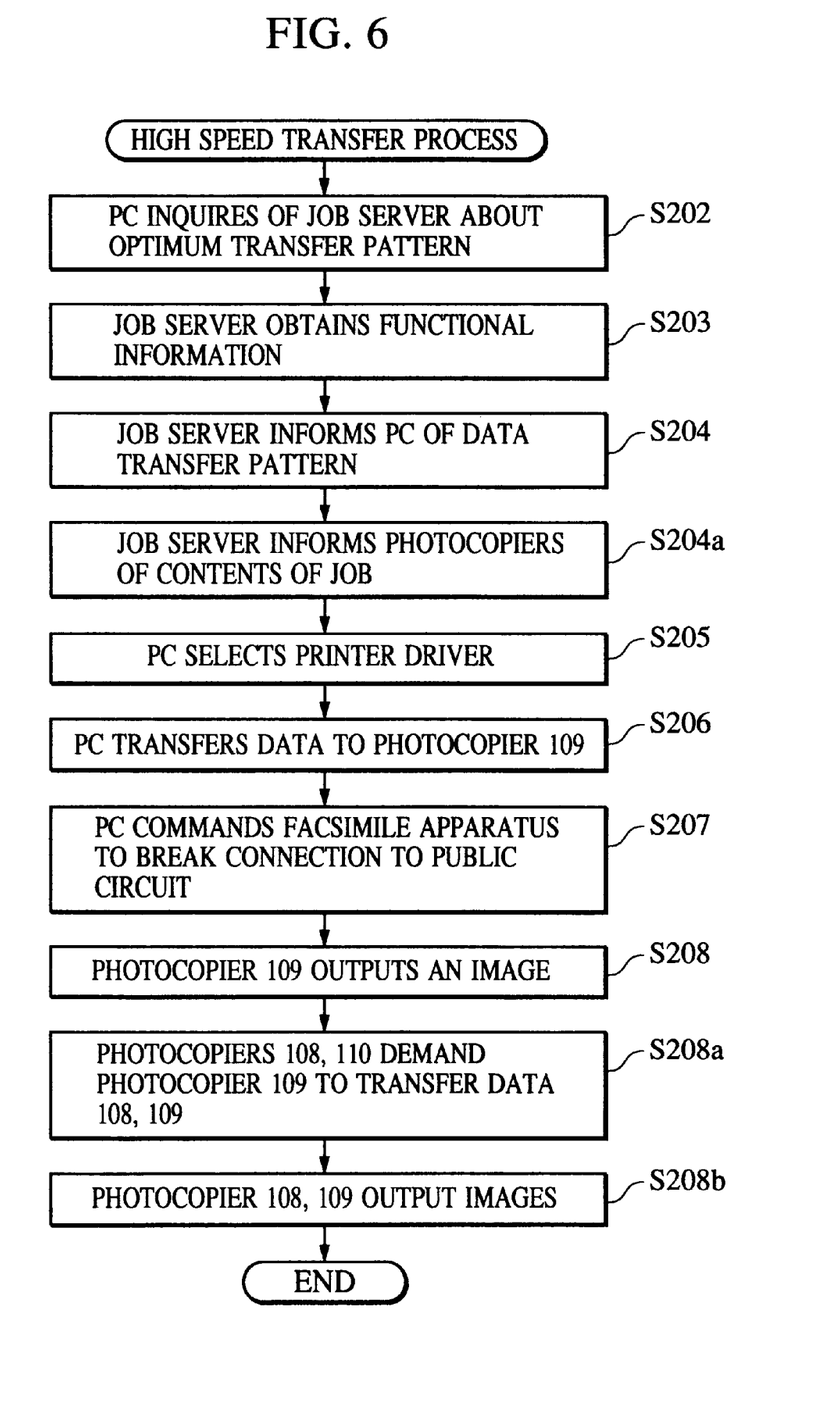
FIG. 6 is a flowchart showing a high-speed transfer process according to a second embodiment of the present invention.

A second embodiment regarding the high-speed transfer process will be described by referring a flowchart shown in FIG. 6. In this flowchart the identical processing steps as those in FIG. 5 are denoted by the same reference numerals. Accordingly, description of the same processing step will be omitted. Only steps characteristic of this embodiment will be described.

The second embodiment assumes that the photocopier 109 has the function of temporarily storing, in the HDD 202 or the memory 203, image data bit-mapped from a received PS code.

After the processing in steps S202 to S204, in step S204a, the job server 107 informs the photocopiers 108 and 110 that image data is stored in the photocopier 109. The job server 107 also commands the photocopiers 108 and 110 to issue commands for the photocopier 109 to output the image data bit-mapped from the PS code received from the PC 102, stored in the HDD 202 or the memory 203.

After the processing in steps S205 to S208, in step S209a, the photocopiers 108 and 110 demand the photocopier 109 to transfer the image data, based on the command from the job server 107 in step S204a. Then, when the photocopier 109 is in a condition where it can communicate with the external unit via the LAN 106 after having bit-mapped the PS code transferred from the PC 102, it transfers the bit-map data to the photocopiers 108 and 110 in response to their demands.

Finally, in step S208b, on receiving the bit-map image data from the photocopier 109, the photocopiers 108 and 110 transfer the received data to each printer 219 to form an image, from which a printed image is outputted.

Therefore, according to the above-described second embodiment, the job server 107 informs each photocopier which outputs an image, of contents of a job, and the photocopiers 108 and 110 demand the photocopier 109 to transfer image data. Thus, when the photocopier 109 accesses the photocopiers 108 and 110 to re-transfer the image data, the photocopier 109 does not need to wait until each photocopier accepts the re-transfer, which advantageously eliminates time-consuming processing by the photocopier 109 for the re-transfer.

[Third Embodiment]

Figure 7:
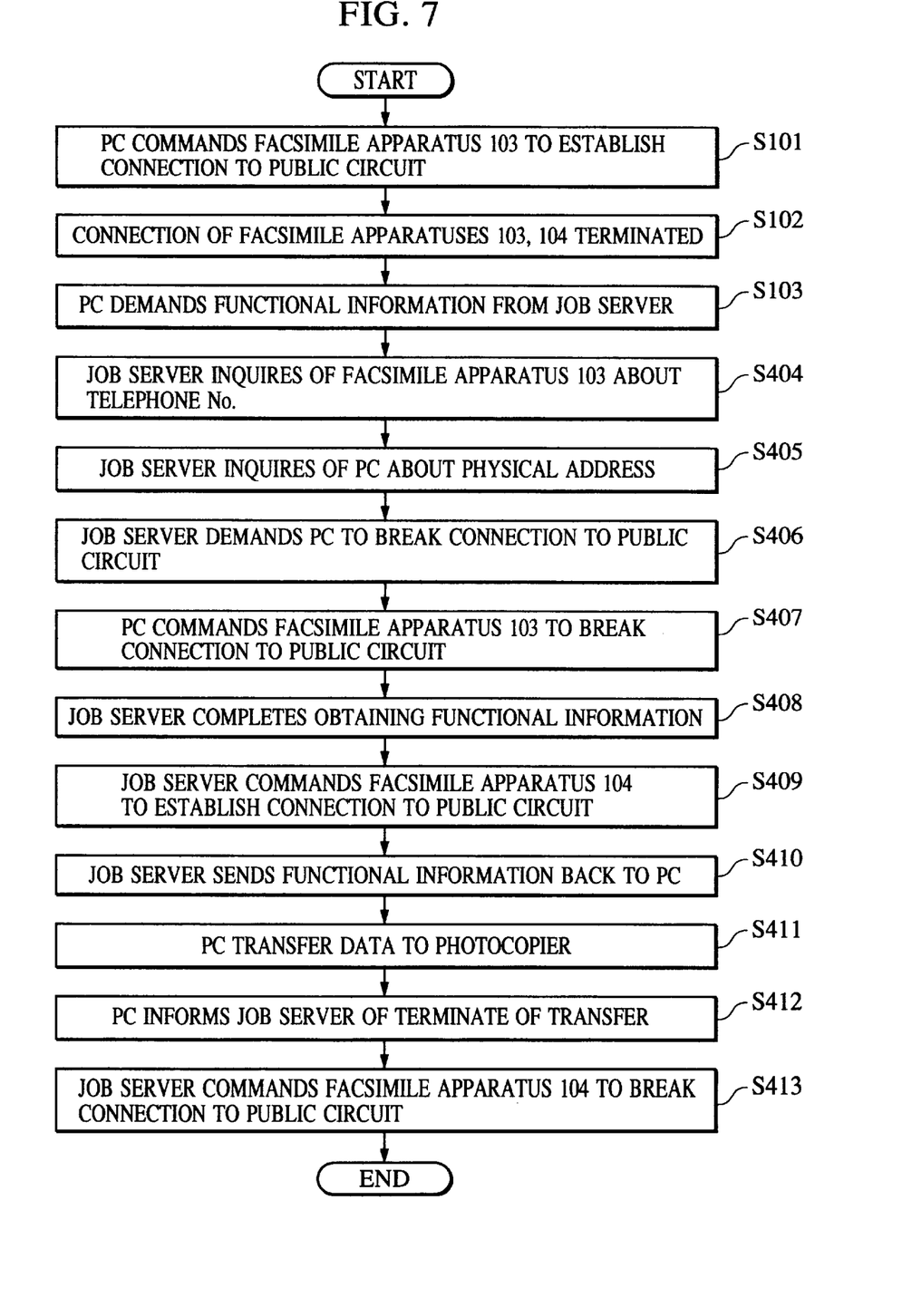
FIG. 7 is a flowchart showing an image transfer process according to a third embodiment of the present invention.

An image transfer process which is effective in reducing a circuit cost and enhances efficiency in which the circuit is used, in addition to the processing in the first embodiment, will be described by referring to a flowchart shown in FIG. 7. In this flowchart the identical processing steps as those in FIG. 3 are denoted by the same reference numerals. Accordingly, description of the identical steps will be omitted. Only processing steps characteristic in this embodiment will be described.

After the processing in steps S101 to S103, when the job server 107 cannot instantly obtain functional information on the photocopiers, due to a high communication load of the LAN 106, the job server 107 communicates with the facsimile apparatus 103 to obtain its telephone number, and stores its contents. In step S405, the job server 107 communicates with the PC 102 to obtain the physical address of the PC 102 on the LAN 101, and stores its contents. In step S406, the job server 107 demands the PC 102 to break connection to the public circuit 105. In response to this demand, in step S407, the PC 102 commands the facsimile apparatus 103 to break connection to the public circuit 105, once. Accordingly, connection to the public circuit 105 is broken.

When a communication load of the LAN decreases, and the job server 107 obtains the functional information on the photocopiers in step S408, the job server 107 informs the facsimile apparatus 104 of the previously stored telephone number of the facsimile apparatus 103, and commands the facsimile apparatus 104 to establish connection to the facsimile apparatus 103 via the public circuit 105. When the job server 107 has been informed of the restored connection and the completion of connection from the facsimile apparatus 104 to the facsimile apparatus 103, the job server 107 accesses the PC 102 based on the previously stored physical address of the PC 102, and transfers the functional information on the photocopiers connected to the LAN 106 thereto.

The PC 102, which has received the functional information, transfers the image data to the photocopier selected by the user in step S411, and in step S412, termination of the data transfer causes the PC 102 to inform the job server 107 of the termination of the data transfer. The job server 107, which has been informed of the termination of the data transfer, commands the facsimile apparatus 104 to break connection, finally in step S413. In accordance with this command, the facsimile apparatus 104 breaks connection to the public circuit 105, and the process terminates.

Therefore, according to the above-described embodiment, in a case where the job server 107 cannot instantly respond to the PC 102 due to a high communication load of the LAN 106 when the PC 102 has demanded functional information on units connected to the LAN 106 from the job server 107, the connection of the PC 102 to a public circuit is broken, and after the job server 107 has obtained the functional information, the communication between the PC 102 and the job server 107 is performed by establishing connection to the public circuit again. Thus, this manner eliminates time-consuming connection to the public circuit despite no actual communication, which can reduces an unnecessary circuit cost.

In addition, it need hardly be said that the object of the present invention has been achieved by providing a storage medium which contains program codes for software realizing the functions of the above-described embodiments in a system or unit so that a computer (or CPU, MPU) in the system or unit reads and executes the program code stored in the storage medium.

In this case, the read program code itself realizes the functions of the above-described embodiments. Thus, the storage medium containing the program code constitutes the present invention.

For example, a floppy disc, a hard disc, a magneto-optical disc, a CD-ROM, a CD-R, a magnetic tape, a non-volatile memory card, a ROM, or the like may be used as the storage medium for supplying the program codes.

Moreover, it need hardly be said that the present invention includes not only a case where the functions of the above-described embodiments are realized by executing a program code read by the computer, but also another case where an OS (operating system) and so forth operating in the computer execute part or the whole of actual processes, based on instructions of the program code, by which processes the functions of the above-described embodiments are realized.

Also, it need hardly be said that the present invention includes a case where a program code read from a recording medium is written into a memory on a feature expansion board mounted in a computer or in a feature expansion unit connected to the computer, and subsequently, a CPU or the like on feature expansion board or in the feature expansion unit executes part or the whole of actual processes, by which the functions of the embodiments are realized.

Figure 8:
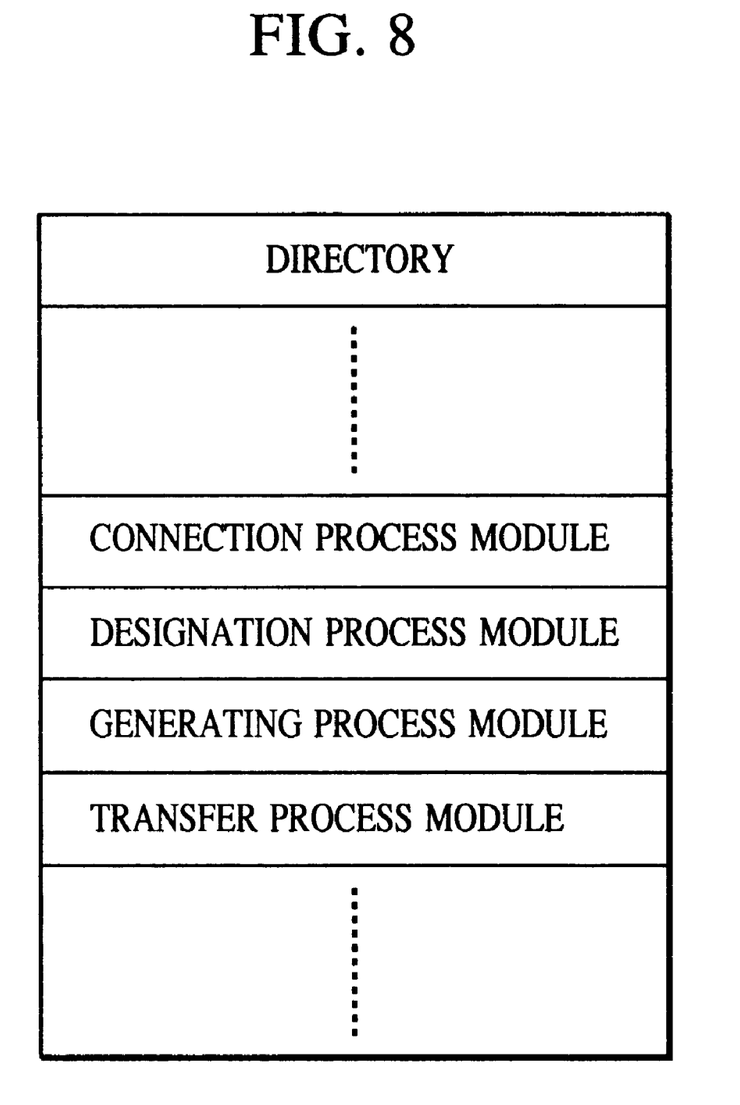
FIG. 8 is a chart showing a memory map.

When the present invention is applied to the above storage medium, program codes corresponding to the previously described flowcharts need to be stored in the storage medium. In simple explanation, modules on a map shown in FIG. 8 are stored in the storage medium.

In other words, it is sufficient to store at least "CONNECTION PROCESS MODULE", "DESIGNATION PROCESS MODULE", "GENERATING PROCESS MODULE", and "TRANSFER PROCESS MODULE" in the storage medium.

What is claimed is:

1. An image transfer system formed by mutually connecting via a public circuit a first system including an image data generating apparatus and a second system including a plurality of image formation apparatuses capable of processing image data described in different page-description languages, said image transfer system comprising:

designation means for designating either a first mode for transferring the image data generated by the image data generating apparatus at a low speed or a second mode for transferring the image data at a high speed;

selecting means for selecting an optimum page-description language for transferring the image data;

generating means for generating the image data described by the selected page-description language; and transfer means for transferring the image data generated by said generating means to the second system, wherein, in the first mode, said designation means designates an image formation apparatus to which the image data is to be outputted as a need arises, and wherein, in the second mode, said designation means designates an image formation apparatus to which the image data is to be outputted regardless of a number of the image formation apparatus to be outputted to and breaks connection to the second system in the second mode after transferring the image data to an apparatus in the second system.

2. An image transfer system according to claim 1, wherein the first and second systems include facsimile apparatuses, respectively, and each facsimile apparatus establishes a connection to the public circuit.

3. An image transfer system according to claim 1, wherein the image data generating apparatus includes a computer.

4. An image transfer system according to claim 1, wherein each of the plurality of image formation apparatuses has a printer function for outputting an image on a recording medium.

5. An image transfer system according to claim 1, wherein the page-description languages include Laser-beam-printer Image Processing System (LIPS), Post Script, and Printer Control Language (PCL).

6. An image transfer system according to claim 1, further comprising:

analysis means for analyzing the functions of the plurality of image formation apparatuses;

informing means for informing the image data generating apparatus of an analyzed result from said analysis means;

generating control means for selecting an optimum page-description language to control said generating means to generate said image data in accordance with information from said informing means when the image data is transferred in the second mode;

transfer control means for controlling said transfer means to transfer the image data to an image formation apparatus capable of processing the selected optimum page-description language; and connection control means for breaking a connection to said public circuit after termination of transfer of the image data described in the selected optimum page-description language.

7. An image transfer system according to claim 6, wherein the plurality of image formation apparatuses are mutually connected by a local area network (LAN).

8. An image transfer system according to claim 7, wherein the image formation apparatus capable of processing the selected optimum page-description language includes:

expansion means for expanding the image data sent from said transfer means to bit-map data; and bit-map data transfer means for transferring the bit-map data expanded by the expansion means to another image formation apparatus designated by said designation means via the LAN.

9. An image transfer system according to claim 8, further comprising storage means for storing the bit-map data.

10. An image transfer system according to claim 8, wherein the other image formation apparatus designated by said designation means, which is incapable of processing the selected optimum page-description language, includes transfer-demand means for demanding data transfer from the image formation apparatus capable of processing the selected optimum page-description language.

11. An image transfer system according to claim 7, wherein the second system includes:

monitor means for monitoring a communication load of the LAN;

inquiry means for inquiring a telephone number of the first system in accordance with the communication load monitored by the monitor means;

circuit breaker means for breaking connection to the public circuit after the inquiry; and restoration means for restoring connection to the first system with the telephone number obtained by the inquiry means.

12. An image transfer system according to claim 11, wherein said transfer control means controls said transfer means to transfer the image data after a connection by the restoration means.

13. A method for transferring image data between a first system including an image data generating apparatus and a second system including a plurality of image formation apparatuses and connectable to the first system via a public circuit, the plurality of image formation apparatuses being capable of processing image data described in different page-description languages, said method comprising:

a connection step of connecting the first system and the second system using the public circuit;

a designation step of designating either a first mode for transferring the image data generated by the image data generating apparatus at a low speed or a second mode for transferring the image data at a high speed;

a selecting step of selecting an optimum page-description language for transferring the image data;

a generating step of generating the image data described by the selected page-description language; and a transfer step of transferring the image data generated in said generating step to the second system, wherein, in the first mode, said designation step designates an image formation apparatus to which the image data is to be outputted as a need arises, and wherein, in the second mode, said designation step designates an image formation apparatus to which the image data is to be outputted regardless of a number of the image formation apparatus to be outputted to and breaks connection to the second system in the second mode after transferring the image data to an apparatus in the second system.

14. A computer-readable memory storing a program for executing a method for transferring image data between a first system including an image data generating apparatus and a second system including a plurality of image formation apparatuses and connectable to the first system via a public circuit, the plurality of image formation apparatuses being capable of processing image data described in different page-description languages, said method comprising:

a connection step of connecting the first system and the second system using the public circuit;

a designation step of designating either a first mode for transferring the image data generated by the image data generating apparatus at a low speed or a second mode for transferring the image data at a high speed;

a selecting step of selecting an optimum page-description language for transferring the image data;

a generating step of generating the image data described by the selected page-description language; and a transfer step of transferring the image data generated in said generating step to the second system, wherein, in the first mode, said designation step designates an image formation apparatus to which the image data is to be outputted as a need arises, and wherein, in the second mode, said designation step designates an image formation apparatus to which the image data is to be outputted regardless of a number of the image formation apparatus to be outputted to and breaks connection to the second system in the second mode after transferring the image data to an apparatus in the second system.

15. A first image formation apparatus in an image transfer system formed by mutually connecting via a public circuit a first system including an image data generating apparatus and a second system including a plurality of image formation apparatuses, including said first image formation apparatus, capable of processing image data described in different page-description languages, said first image transfer system comprising:

designation means for designating either a first mode for transferring the image data generated by the image data generating apparatus at a low speed or a second mode for transferring the image data at a high speed;

selecting means for selecting an optimum page-description language for transferring the image data;

generating means for generating the image data described by the selected page-description language; and transfer means for transferring the image data generated by said generating means to the second system, wherein, in the first mode, said designation means designates an image formation apparatus to which the image data is to be outputted as a need arises, and wherein, in the second mode, the designation means designates an image formation apparatus to which the image data is to be outputted regardless of a number of the image formation apparatus to be outputted to and breaks connection to the second system in the second mode after transferring the image data to an apparatus in the second system.

16. A method for operating a first image formation apparatus in a transfer method for transferring image data between a first system including an image data generating apparatus and a second system including a plurality of image formation apparatuses including the first image formation apparatus and connectable to the first system via a public circuit, the plurality of image formation apparatuses being capable of processing image data described in different page-description languages, said transfer method comprising:

a connection step of connecting the first system and the second system using the public circuit;

a designation step of designating either a first mode for transferring the image data generated by the image data generating apparatus at a low speed or a second mode for transferring the image data at a high speed;

a selecting step of selecting an optimum page-description language for transferring the image data;

a generating step of generating the image data described by the selected page-description language; and a transfer step of transferring the image data generated in said generating step to the second system, wherein, in the first mode, said designation step designates an image formation apparatus to which the image data is to be outputted as a need arises, and wherein, in the second mode, said designation step designates an image formation apparatus to which the image data is to be outputted regardless of a number of the image formation apparatus to be outputted to and breaks connection to the second system in the second mode after transferring the image data to an apparatus in the second system.

17. A computer-readable memory storing a program for executing a method for operating a first image formation apparatus in a transfer method for transferring image data between a first system including an image data generating apparatus and a second system including a plurality of image formation apparatuses that includes the first image formation apparatus, connectable to the first system via a public circuit, the plurality of image formation apparatuses being capable of processing image data described in different page-description languages, said method comprising:

a connection step of connecting the first system and the second system using the public circuit;

a designation step of designating either a first mode for transferring the image data generated by the image data generating apparatus at a low speed or a second mode for transferring the image data at a high speed;

a selecting step of selecting an optimum page-description language for transferring the image data;

a generating step of generating the image data described by the selected page-description language; and a transfer step of transferring the image data generated in said generating step to the second system, wherein, in the first mode, said designation step designates an image formation apparatus to which the image data is to be outputted as a need arises, and wherein, in the second mode, said designation step designates an image formation apparatus to which the image data is to be outputted regardless of a number of the image formation apparatus to be outputted to and breaks connection to the second system in the second mode after transferring the image data to an apparatus in the second system.

18. A job server apparatus in an image transfer system formed by mutually connecting via a public circuit a first system including an image data generating apparatus and a second system including a plurality of image formation apparatuses and said job server apparatus, each of the plurality of image formation apparatuses being capable of processing image data described in different page-description languages, said job server apparatus comprising means for obtaining information of an optimum transfer pattern for transfer of image data based on functional information of the plurality of image formation apparatuses indicative of which page-description languages are supported by the respective image formation apparatuses, and the image transfer system comprising:
designation means for designation either a first mode for transferring the image data generated by the image data generating apparatus at a low speed or a second mode for transferring the image data at a high speed;
selecting means for selecting an optimum page-description language for transferring the image data;
generating means for generating the image data described by the selected page-description language; and
transfer means for transferring the image data generated by the generating means to the second system,
wherein, in the second mode, said job server apparatus provides the information of the optimum transfer pattern of the image data between the plurality of image formation apparatuses to the first system, and the designation means designates an image formation apparatus to which the image data is to be outputted regardless of a number of the image formation apparatus to be outputted to and breaks connection to the second system in the second mode after transferring the image data to an apparatus in the second system.

19. A method of operating a job server apparatus in an image transfer system formed by mutually connecting via a public circuit a first system including an image data generating apparatus and a second system including a plurality of image formation apparatuses and the job server apparatus, each of the plurality of image formation apparatuses being capable of processing image data described in different page-description languages, the image transfer system including designation means for designating either a first mode for transferring the image data generated by the image data generating apparatus at a low speed or a second mode for transferring the image data at a high speed, selecting means for selecting an optimum page-description language for transferring the image data, generating means for generating the image data described by the selected page-description language, and transfer means for transferring the image data generated by the generating means to the second system, wherein, in the second mode, said method comprises, in the job server apparatus,:
a first step of obtaining information of an optimum transfer pattern for transfer of image data based on functional information of the plurality of image formation apparatuses indicative of which page-description languages are supported by the respective image formation apparatuses; and
a second step of providing the information of the optimum transfer pattern of the image data between the plurality of image formation apparatuses to the first transfer system, and
wherein the designation means designates an image formation apparatus to which the image data is to be outputted regardless of a number of the image formation apparatus to be outputted to and breaks connection to the second system in the second mode after transferring the image data to an apparatus in the second system.

20. A computer-readable memory storing a program for a method of operating a job server apparatus in an image transfer system formed by mutually connecting via a public circuit a first system including an image data generating apparatus and a second system including a plurality of image formation apparatuses and the job server apparatus, each of the plurality of image formation apparatuses being capable of processing image data described in different page-description languages, the image transfer system including designation means for designating either a first mode for transferring the image data generated by the image data generating apparatus at a low speed or a second mode for transferring the image data at a high speed, selecting means for selecting an optimum page-description language for transferring the image data, generating means for generating the image data described by the selected page-description language, and transfer means for transferring the image data generated by the generating means to the second system, wherein, in the second mode, said method comprises, in the job server apparatus,:
a first step of obtaining information of an optimum transfer pattern for transfer of image data based on functional information of the plurality of image formation apparatuses indicative of which page-description languages are supported by the respective image formation apparatuses; and
a second step of providing the information of the optimum transfer pattern of the image data between the plurality of image formation apparatuses to the first transfer system, and
wherein the designation means designates an image formation apparatus to which the image data is to be outputted regardless of a number of the image formation apparatus to be outputted to and breaks connection to the second system in the second mode after transferring the image data to an apparatus in the second system.

* * * * *

UNITED STATES PATENT AND TRADEMARK OFFICE
CERTIFICATE OF CORRECTION

PATENT NO. : 6,081,347

DATED : June 27, 2000

INVENTOR(S) : MASATAKA YASUDA

Page 1 of 2

It is certified that error appears in the above-identified patent and that said Letters Patent is hereby corrected as shown below:

COLUMN 1

Line 13, "(LANS)" should read --(LANs)--.
　　Line 37, "an" should read --a--.
　　Line 47, "an" should read --a--.

COLUMN 3

Line 14, "an" should read --a--.
　　Line 25, "reduces" should read --reduce--.

COLUMN 4

Line 25, "when" should read --, which--.

COLUMN 5

Line 45, "output" should read --outputs--.

COLUMN 10

Line 40, "reduces" should read --reduce--.

UNITED STATES PATENT AND TRADEMARK OFFICE
CERTIFICATE OF CORRECTION

PATENT NO.  : 6,081,347
DATED       : June 27, 2000
INVENTOR(S) : MASATAKA YASUDA

It is certified that error appears in the above-identified patent and that said Letters Patent is hereby corrected as shown below:

COLUMN 16

```
Line 2, "apparatus,:" should read --apparatus:--.
Line 39, "apparatus,:" should read --apparatus:--.
```

Signed and Sealed this

Seventeenth Day of April, 2001

Attest:

NICHOLAS P. GODICI

Attesting Officer    Acting Director of the United States Patent and Trademark Office